(12) United States Patent
Calisch et al.

(10) Patent No.: US 10,576,701 B2
(45) Date of Patent: Mar. 3, 2020

(54) PRODUCTION OF COMPOSITE PARTS

(71) Applicant: Massachusetts Institute of Technology, Cambridge, MA (US)

(72) Inventors: Sam Calisch, Cambridge, MA (US); Neil Gershenfeld, Cambridge, MA (US); Spencer Wilson, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 888 days.

(21) Appl. No.: 14/960,825

(22) Filed: Dec. 7, 2015

(65) Prior Publication Data

US 2016/0193792 A1  Jul. 7, 2016

Related U.S. Application Data

(60) Provisional application No. 62/100,753, filed on Jan. 7, 2015.

(51) Int. Cl.
| | | |
|---|---|---|
| *B29C 70/48* | (2006.01) | |
| *B29C 70/54* | (2006.01) | |
| *B29C 70/38* | (2006.01) | |
| *B29K 63/00* | (2006.01) | |
| *B29K 105/10* | (2006.01) | |
| *B29K 307/04* | (2006.01) | |
| *B29C 70/32* | (2006.01) | |

(52) U.S. Cl.
CPC ............ *B29C 70/48* (2013.01); *B29C 70/382* (2013.01); *B29C 70/541* (2013.01); *B29C 70/32* (2013.01); *B29K 2063/00* (2013.01); *B29K 2105/10* (2013.01); *B29K 2307/04* (2013.01); *B29K 2823/065* (2013.01)

(58) Field of Classification Search
None
See application file for complete search history.

(56) References Cited

U.S. PATENT DOCUMENTS

| | | | |
|---|---|---|---|
| 3,220,692 A | 11/1965 | Ecklund | |
| 4,135,695 A | 1/1979 | Capdevila et al. | |
| 4,874,564 A | 10/1989 | Sudani et al. | |
| 4,876,050 A * | 10/1989 | Horton | B29C 35/0222 264/102 |
| 5,045,251 A | 9/1991 | Johnson | |
| 5,126,091 A | 6/1992 | Melton | |

(Continued)

FOREIGN PATENT DOCUMENTS

WO    WO2013049966 A1    4/2013

OTHER PUBLICATIONS

International Search Report and Written Opinion, from PCT/US15/64201, dated Feb. 12, 2016, WO.

*Primary Examiner* — Benjamin A Schiffman
(74) *Attorney, Agent, or Firm* — Robert P. Greenspoon; Flachsbart & Greenspoon LLC (57) ABSTRACT

A process for producing a composite part includes (a) applying a loose carbon filament to a receiving portion of a first mold piece; (b) reversibly coupling the first mold piece with at least a second mold piece to form a first mold layer, wherein an interior region of the first mold layer includes a pocket configured to receive a curable resin, the pocket having a shape of the composite part; (c) infusing the curable resin into the pocket; and (d) curing the resin to form the composite part.

19 Claims, 7 Drawing Sheets

(56) References Cited

U.S. PATENT DOCUMENTS

| | | |
|---|---|---|
| 6,811,733 B2 | 11/2004 | Nelson et al. |
| 2005/0266220 A1 | 12/2005 | La Forest et al. |
| 2008/0093017 A1 | 4/2008 | Young |
| 2008/0203622 A1 | 8/2008 | Graham |
| 2011/0180209 A1 | 7/2011 | Grabau |
| 2014/0159267 A1 | 6/2014 | Murch et al. |

* cited by examiner

PRODUCTION OF COMPOSITE PARTS

REFERENCE TO RELATED APPLICATIONS

This application claims the benefit of the filing date under 35 U.S.C. § 119(e) of U.S. Provisional Application Ser. No. 62/100,753 filed Jan. 7, 2015, which is hereby incorporated by reference.

FEDERALLY SPONSORED RESEARCH OR DEVELOPMENT

This invention was made with Government support under Grant No. CMMI-1344222 awarded by the National Science Foundation. The Government has certain rights in the invention.

TECHNICAL FIELD

The present teachings relate generally to the production of composite parts.

BACKGROUND

Composite materials are materials manufactured from two or more constituent materials. Composite parts may be produced by a variety of processes including but not limited to filament winding (FW) and resin transfer molding (RTM).

In conventional FW, a fiber tow—typically wet—is wound around a central mandrel. In developing this process, limitations on the cross-sectional geometries of the manufactured parts has been observed. For example, the need for eventual extraction of the central mandrel without destroying the finished composite part may limit the axial shape of the central mandrel to draftable geometries that are susceptible to movement via drawing and/or pulling. As a result, the shape of the mandrel used for FW is typically limited to relatively simple, convex cross-sections.

In resin transfer molding (RTM), a fiber "layup" (e.g., graphite) is typically added as a sheet or a pre-form into a mold. Resin (heated or otherwise) is then injected into the mold cavity to impregnate the fiber layup, after which the resin is cured to produce the composite part. However, the use of sheets and pre-forms for the layup does not allow for control over fiber orientation. In addition, the use of sheets and pre-forms may restrict the parts to geometries that can be decomposed into relatively planar patches, and may further result in the production of composite parts that require additional and undesirable post-machining (e.g., trimming of excess materials and the like). This post-machining is undesirable inasmuch as it adds cost and complexity to the overall manufacturing process.

SUMMARY

The scope of the present invention is defined solely by the appended claims, and is not affected to any degree by the statements within this summary.

By way of introduction, a first process for producing a composite part in accordance with the present teachings includes (a) applying a loose carbon filament to a receiving portion of a first mold piece; (b) reversibly coupling the first mold piece with at least a second mold piece to form a first mold layer, wherein an interior region of the first mold layer includes a pocket configured to receive a curable resin, the pocket having a shape of the composite part; (c) infusing the curable resin into the pocket; and (d) curing the resin to form the composite part.

A second process for producing a composite part in accordance with the present teachings includes (a) applying a loose carbon filament to a first receiving portion of a first mold piece via a three-axis computer-controlled machine; (b) reversibly coupling the first mold piece with a second mold piece to form a first mold layer, wherein an interior region of the first mold layer includes a pocket configured to receive a curable resin, the pocket having a shape of the composite part; (c) applying the loose carbon filament via the three-axis computer-controlled machine to a second receiving portion, wherein the second receiving portion is provided on the second mold piece and/or on a third mold piece; (d) forming a second mold layer by (i) reversibly coupling the third mold piece with the first mold piece and/or the second mold piece or (ii) reversibly coupling the third mold piece with the first mold piece and/or the second mold piece and, further, reversibly coupling the third mold piece with a fourth mold piece; (e) infusing the curable resin into the mold stack; and (f) curing the resin to form the composite part. The first mold layer and the second mold layer are configured to be ganged together to form a mold stack, and the first mold layer and the second mold layer are in fluid communication.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Processes for the net-shape or at least near-net-shape production of filament-containing molded composite parts have been discovered and are described herein. A multi-part mold configured for the batch production of such filament-containing molded composite parts is likewise described.

Similar to compression molding (CM), a composite part produced in accordance with the present teachings may be formed in the void between two or more mold pieces. However, in contrast to CM, layup is first performed using dry fiber. The dry fiber is applied to a mold piece with directional alignment, after which a resin is drawn through a mold cavity containing the dry fiber. In accordance with the present teachings, the dry fiber introduced into a mold is wound into a desired shape (e.g., with directional alignment) as opposed to being merely provided as a sheet or a pre-form as in conventional RTM. By introducing the dry fiber with such directional alignment, superior material properties may be achieved. For example, the introduction of the dry fiber with directional alignment as described herein may provide substantial stiffness and increased strength in the resultant composite part. Furthermore, the shape limitations associated with FW do not similarly limit processes in accordance with the present teachings. On the contrary, molds in accordance with the present teachings may have complex geometries yet still be configured for facile separation for de-molding and reuse.

Processes in accordance with the present teachings may be used to produce a plurality of parts in parallel without requiring multiple runs through an autoclave. For example, a plurality of compression-type molds may be dry-wound sequentially and then stacked one on top of another. This stacked configuration may be used to increase throughput in an automated winding machine since a single coordinate system may be retained across a plurality of winding tasks. Moreover, since the individual layers in the stacked configuration may be configured to be in fluid communication with one another, a stack of dry-wound molds in accordance with the present teachings may be infused with resin and cured in parallel, thereby substantially increasing the utility of the composite infrastructure (e.g., vacuum pumps and autoclaves).

It is to be understood that elements and features of the various representative embodiments described below may be combined in different ways to produce new embodiments that likewise fall within the scope of the present teachings.

By way of general introduction, a first process for producing a composite part in accordance with the present teachings includes: (a) applying a loose carbon filament to a receiving portion of a first mold piece; (b) reversibly coupling the first mold piece with at least a second mold piece to form a first mold layer, wherein an interior region of the first mold layer includes a pocket configured to receive a curable resin, the pocket having a shape of the composite part; (c) infusing the curable resin into the pocket; and (d) curing the resin to form the composite part.

Figures 5A, 5B:
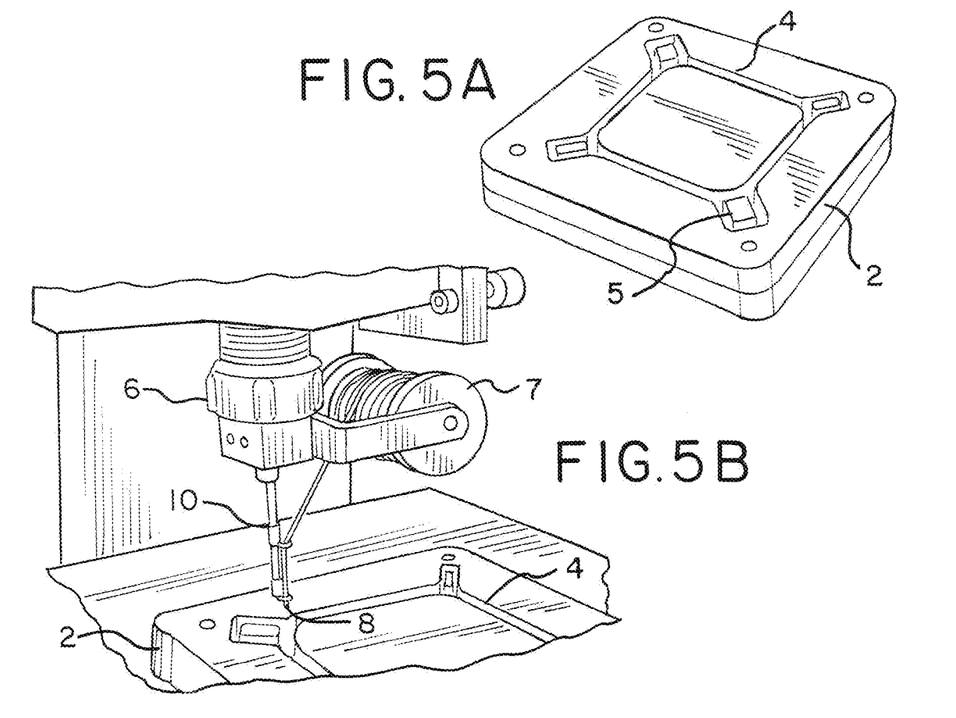
FIG. 5A shows a perspective view of an exemplary mold piece configured to receive winding.
FIG. 5B shows a perspective view of an exemplary automated winding attachment for use with a three-axis computer numerical control (CNC) machine.

As used herein, the phrase "mold piece" refers to at least one of at least a pair of complementary parts that—when combined and/or assembled—are together configured to form a "mold layer." It is to be understood that an individual "mold piece" as used herein may or may not contain one or a plurality of separable elements (e.g., internal removable elements) that, in some embodiments, may be used to facilitate de-molding (e.g., the corner posts 5 shown in FIG. 5A described below). As used herein, the phrase "mold layer" refers to a combination of at least two mold pieces that together provide and/or otherwise form an interior pocket-containing region that is configured to receive a curable resin and to shape and/or form a composite part. As used herein, the phrase "mold stack" refers to a combination of at least two "mold layers" configured to be in at least partial fluid communication, wherein the combination is configured such that two or more of the at least two "mold layers" are configured for substantially parallel infusion with resin and substantially parallel curing of infused resin.

In some embodiments, the first mold piece and/or the second mold piece is monolithic (e.g., formed from one contiguous piece of material). In some embodiments, the first mold piece and/or the second mold piece is polylithic (e.g., formed from a combination of separate parts). For polylithic mold pieces, one or more of the separate parts may be configured for reversible assembly and/or disassembly (e.g., to prevent the occurrence of "mold lock," whereby certain geometries of the finished composite part—for example, geometries having tight corners—may impede the de-molding process).

In some embodiments, the application of the loose carbon filament to the receiving portion may be achieved using a three-axis computer-controlled machine. For example, an attachment configured to hold a spool of the loose carbon filament and to guide the fiber (e.g., via loops and/or the like) to the tip of an applicator (e.g., a thin precision rod) configured to directionally align the filament into a pocket in a mold piece may be used. In some embodiments, the loose carbon filament includes spoolable dry carbon fiber tow. In some embodiments, the outside diameter of tubing (e.g., stainless steel tubing) that is used to route carbon fiber tow in accordance with the present teachings may be less than about ⅛ inch (e.g., about 1/16 inch). In some embodiments, the loose carbon filament includes 1K carbon fiber tow, in some embodiments 3K carbon fiber tow, in some embodiments 6K carbon fiber tow, in some embodiments 12K carbon fiber tow, in some embodiments 24 carbon fiber tow, and/or in some embodiments even higher (e.g., 50K, 60K) carbon fiber tow.

In some embodiments, the first mold piece and/or the second mold piece is monolithic. In some embodiments, the first mold piece and/or the second mold piece is polylithic. In some embodiments, the second mold piece includes a compacting portion. In such embodiments, the compacting portion (e.g., a male element) and the receiving portion (e.g., a female element) are together configured to compact the loose carbon filament therebetween (e.g., prior to introduction of the resin into the mold layer). In some embodiments, the length of the compacting portion is less than a depth of the receiving portion by an amount that it is substantially equal to a thickness of the composite part.

In some embodiments, processes in accordance with the present teachings further include detachably and/or otherwise reversibly coupling one or a plurality of additional mold pieces to the first mold piece and/or the second mold piece to form one or more additional mold layers that are configured for stacking in parallel with the first mold layer. Each of the one or more additional mold layers thus formed may include a respective pocket configured to receive the curable resin. The first mold layer and the one or more additional mold layers may be in fluid communication (e.g., through a system of manifolds, ports, inlets, and/or paths, as further described below), such that a stack of the first mold layer and the one or the more additional mold layers may be configured to receive a parallel infusion of the curable resin (e.g., resin infused into an end mold piece and/or end mold layer may further flow through and infuse one or more additional intermediate mold pieces and/or mold layers).

For embodiments in which one or more additional mold layers are configured to be stacked in parallel with the first mold layer, loose carbon filament may be applied to the receiving portion of the first mold piece and to respective receiving portions of at least one of the one or the plurality of additional mold pieces stacked therewith using for example, a three-axis computer-controlled machine of a type described above.

The first mold layer may include one or more resin inlets and/or one or more vacuum outlets. For embodiments in which one or more additional mold layers are formed in addition to the first mold layer, the first mold layer and/or one or more of the additional mold layers may likewise include one or more resin inlets and/or one or more vacuum outlets. Since, in some embodiments, a mold layer may be formed from a combination of at least two mold pieces, one or both of these constituent mold pieces (which, independently, may be either monolithic or polylithic) may include one or more resin inlets and/or one or more vacuum outlets. A mold piece having one or a plurality of resin inlets and/or one or a plurality of vacuum outlets may be configured for use in a mold stack as either an intermediary piece or as an end piece. In some embodiments (e.g., in which an intermediate mold piece is used as an end mold piece, as further described below), one or more resin inlets and/or one or more vacuum outlets and/or one or more interior openings (e.g., for facilitating ingress/egress of resin with respect to a pocket), and/or the like may be blocked off (e.g., to prevent the ingress and/or egress of material).

Figure 4:
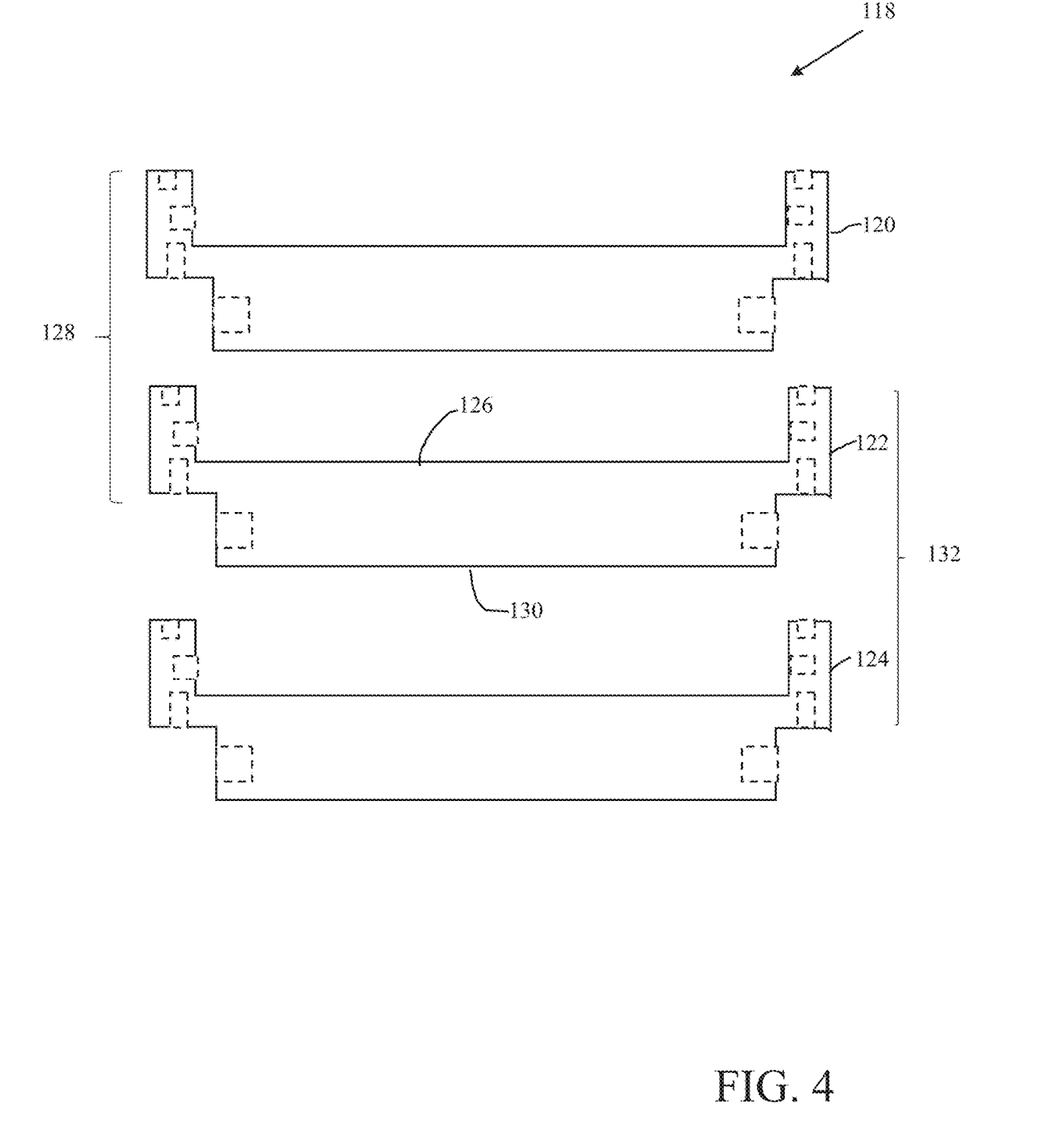
FIG. 4 shows a schematic cross-sectional exploded perspective view of an exemplary fourth mold stack in accordance with the present teachings.

In some embodiments, each mold piece in a mold stack is substantially identical (e.g., the inlet and outlet of an end mold piece may be connected to a resin reservoir and vacuum source, respectively, whereas the inlet and outlet of an intermediate mold piece may be connected to an inlet and outlet of an additional mold piece—either an intermediate mold piece or an end mold piece—such that a conduit is established and/or extended in the mold stack). FIG. 4 described below illustrates a representative mold stack containing a plurality of substantially identical mold pieces.

In other embodiments, the mold pieces used as end mold pieces and the mold pieces used as intermediate mold pieces may be different. For example, in some embodiments, the end mold pieces are configured to connect to a resin reservoir and/or vacuum source as well as to the intermediate mold pieces, and the intermediate mold pieces are configured to be stacked. In some embodiments, intermediate mold pieces may further differ from end mold pieces by including additional channel interconnects between the mold layers to improve resin flow therebetween.

All manner of loose carbon filament is contemplated for use in accordance with the present teachings. In some embodiments, the loose carbon filament includes spoolable dry carbon fiber. In some embodiments, the loose carbon filament includes spoolable carbon fiber tow which, in some embodiments, includes 12 k carbon fiber tow.

In some embodiments, the loose carbon filament applied to a receiving portion of a mold piece is applied with a uniform thickness (e.g., around an entire periphery of the shape). In other embodiments, a thickness of the loose carbon filament applied to a first area of the receiving portion is different than a thickness of the loose carbon filament applied to a second area of the receiving portion. In such embodiments, the depth of the pocket may be uniform or may vary in accordance with the varying thickness of the composite part. In order to preserve fiber fill fraction, the cross-sectional area should be nearly conserved.

All manner of materials used in the preparation of molds (e.g., compression molds, resin transfer molds, and the like) are contemplated for use in accordance with the present teachings. By way of example, in some embodiments, one or more of the mold pieces may include high-density polyethylene (HDPE). In some embodiments, the mold pieces may be manufactured via injection molding (e.g., to provide desired geometries).

Likewise, all manner of binding polymers are contemplated for use in accordance with the present teachings. By way of example, in some embodiments, the binding polymer includes a curable resin (e.g., an epoxy).

A second process for producing a composite part in accordance with the present teachings includes: (a) applying a loose carbon filament to a first receiving portion of a first mold piece via a three-axis computer-controlled machine; (b) reversibly coupling the first mold piece with a second mold piece to form a first mold layer, wherein an interior region of the first mold layer includes a pocket configured to receive a curable resin, the pocket having a shape of the composite part; (c) applying the loose carbon filament via the three-axis computer-controlled machine to a second receiving portion, wherein the second receiving portion is provided on the second mold piece and/or on a third mold piece; (d) forming a second mold layer by (i) reversibly coupling the third mold piece with the first mold piece and/or the second mold piece or (ii) reversibly coupling the third mold piece with the first mold piece and/or the second mold piece and, further, reversibly coupling the third mold piece with a fourth mold piece; (e) infusing the curable resin into the mold stack; and (f) curing the resin to form the composite part. The first mold layer and the second mold layer are configured to be ganged together to form a mold stack, and the first mold layer and the second mold layer are in fluid communication. It will be appreciated that this process may be effectively repeated to add additional mold layers to the mold stack.

For embodiments in which a mold stack includes two or more mold layers, each mold layer may be independently configured to produce a separate composite part. The composite parts thus formed may be the same or different depending on the topographies of the interior regions of the respective mold layers (e.g., the topographies of the pockets). By way of example, a mold stack that includes first and second mold layers may be used to produce first and second composite parts, respectively. In some embodiments, the shape of the first composite part and the shape of the second composite part are substantially identical, thus allowing for rapid simultaneous manufacture of identical parts. In other embodiments, the shape of the first composite part and the shape of the second composite part are different thus allowing for rapid simultaneous manufacture of parts with different geometries. It will be appreciated that a process for producing a composite part in accordance with the present teachings is not limited to using a mold stack that has only two mold layers. In some embodiments, more than two mold layers may be stacked together. In some embodiments, the number of mold layers that may be stacked may be limited only by the time it takes to substantially infuse resin into all of the mold layers and/or by the capacity of the available autoclave. In some embodiments, additional resin inlets and/or outlets may be provided to improve the flow rate.

In some embodiments, one or more of the first mold piece, the second mold piece, the third mold piece, and the fourth mold piece includes an alignment configured to align the first mold layer and the second mold layer (e.g., so as to be substantially parallel in the mold stack).

Each of FIGS. 1-4 depicts a simplified cross-sectional schematic illustration of an exemplary mold stack that may be used in accordance with the present teachings. Various elements that may be optionally provided on one or more of the individual mold pieces that form the mold stacks shown in FIGS. 1-4 (e.g., inlets, outlets, interior openings/ports within the internal cavity, as well as internal interconnecting conduits, passages or galleries there between, internal topographical features corresponding to portions of a composite part to be molded, and/or the like) have either been omitted from these schematic depictions or have been simplified for the sake of clarity. It is to be understood that the provision, quantity, and/or positioning of the inlets, outlets, internal connecting conduits/passges/galleries, interior openings (e.g., openings configured to facilitate ingress/egress of resin with respect to a mold piece, interior cavity/pocket thereof, or as between mold pieces), and/or the like shown on any of the mold pieces depicted in FIGS. 1-4 are merely representative rather than limiting. Alternative placements, quantities, and/or even the omission of one or more of these elements may likewise be implemented in accordance with the present teachings.

Figure 1:
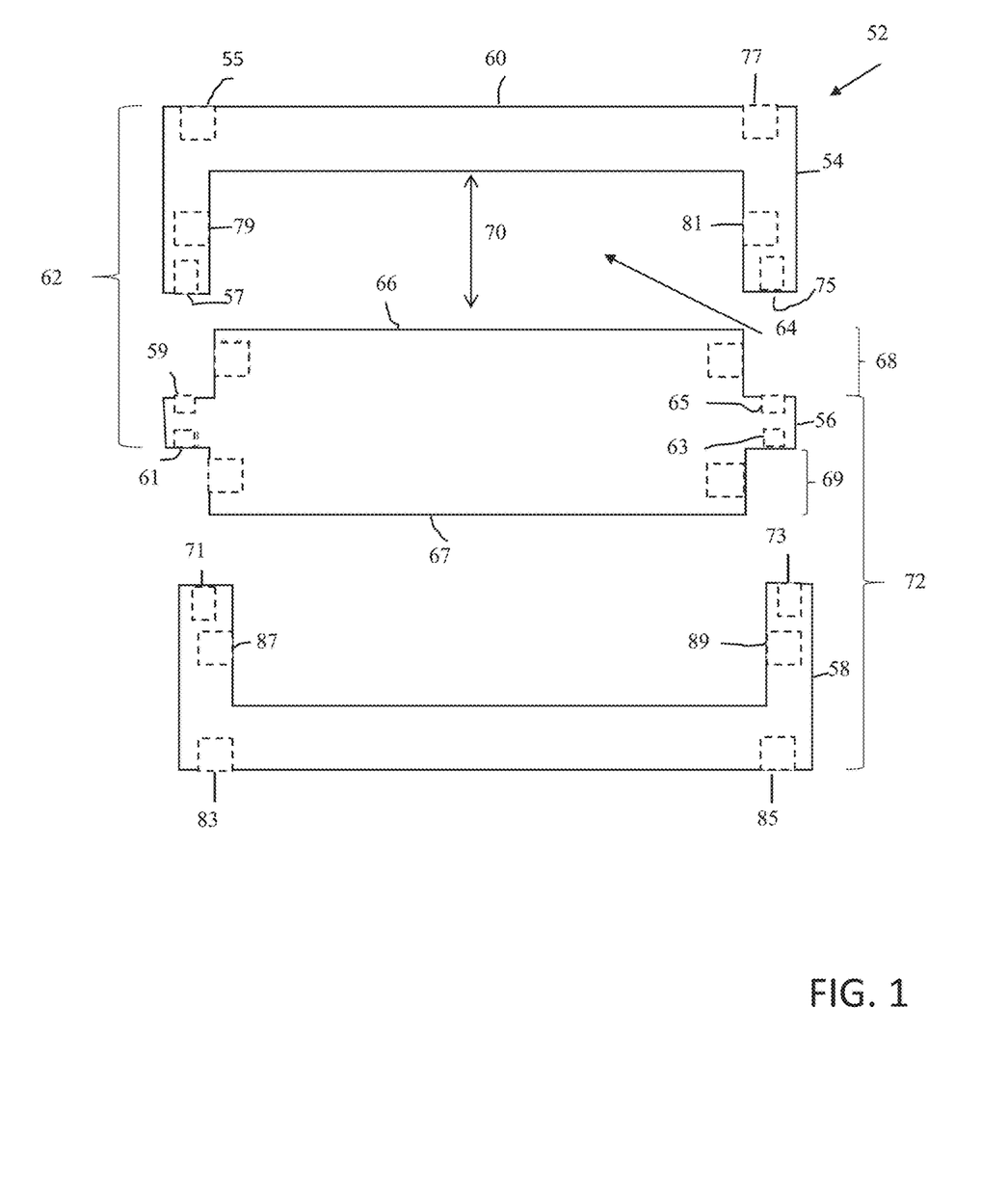
FIG. 1 shows a schematic cross-sectional exploded perspective view of an exemplary first mold stack in accordance with the present teachings.

In addition, for the sake of illustration, the inlets, outlets, internal connecting conduits, and interior openings shown in FIGS. 1-4 have been depicted exclusively as negative or internal elements/features (e.g., internal parts such as elements 55, 77, 79, 81, 57, 64, and other analogous elements shown in FIG. 1) represented in cross-section by dotted lines indicating a hidden cavity or conduit that may not be visible in a cross-sectional plan view. Interconnecting conduits, passages, etc. are not shown. However, it is to be understood that one or more of these features may instead be provided as a positive or protruding element rather than as a negative element, extending from the mold piece. In some implementations a positive or protruding element of one mold piece may be designed to be received by an adjacent negative element of another mold piece when they are assembled. In some implementations, an opening of one mold piece adjacent to the opening of another mold piece form a fluid conduit there between when the mold pieces are assembled.

FIG. 1 shows an example of a mold stack 52 that includes a first mold piece 54, a second mold piece 56, and a third mold piece 58. The three-piece mold stack 52 is configured to produce at least two composite parts (not shown) in accordance with the present teachings. The first mold piece 54 includes a receiving portion 60, and is configured to reversibly couple with the second mold piece 56 to form a first mold layer 62. An interior region of the first mold layer 62 includes a pocket 64 configured to receive a curable resin (not shown). The second mold piece 56 includes a first compacting portion 66 and a second compacting portion 67, and is configured to reversibly couple with the third mold piece 58 to form a second mold layer 72. The length 68 of the first compacting portion 66 is less than a depth 70 of the receiving portion 60 by an amount that is substantially equal to a thickness of the composite part (not shown). The length 68 may be the same as or different than a length 69 of the second compacting portion 69. The representative three-piece mold stack shown in FIG. 1 is configured to form two mold layers—namely, the first mold layer 62 and the second mold layer 72.

As shown in FIG. 1, one or more of the individual mold pieces that combine to form mold stack 52 may be provided with one or more plumbing fixtures (e.g., inlets, outlets, inlets/outlets, and/or internal connecting conduits). By way of example, the first mold piece 54 may include an inlet/outlet 55, an internal conduit 57, an internal conduit 75, and an inlet/outlet 77. Since the first mold piece 54 in FIG. 1 is an end mold piece, the inlet/outlet 55 and the inlet/outlet 77 may be independently configured for connection to a resin reservoir, vacuum source, and/or the like to facilitate resin infusion throughout the mold stack 52. Alternatively, one or both of the inlet/outlet 55 and the inlet/outlet 77 may be reversibly sealed off or omitted in its entirety. The internal conduit 57 and the internal conduit 75 on the first mold piece 54 may be independently configured for connecting to complementary parts (e.g., an internal conduit 59 and an internal conduit 65, respectively) on the adjacent second mold piece 56. The first mold piece 54 may also include one or more interior openings, such as opening 79 and opening 81, which may be independently configured to facilitate ingress/egress of resin with respect to the pocket 64. As shown in FIG. 1, the inlet/outlet 55, the inlet/outlet 77, the internal conduit 57, the internal conduit 75, the opening 79, and the opening 81 are shown as protrusions. However, this depiction is intended as merely illustrative rather than limiting. One or more of these elements may be substantially flush with respect to a surface of the first mold piece 54 or recessed with respect to a surface of the first mold piece 54.

In some embodiments, as shown in FIG. 1, the second mold piece 56 may include internal conduit 59, internal conduit 61, internal conduit 63, and internal conduit 65. Each of these internal conduits may be independently configured to allow passage of resin therethrough or to be selectively blocked off in order to prevent such passage.

In some embodiments, as further shown in FIG. 1, the third mold piece 58 may include internal conduit 71, internal conduit 73, inlet/outlet 83, and inlet/outlet 85. Since the third mold piece 58 in FIG. 1 is an end mold piece, the inlet/outlet 83 and the inlet/outlet 85 may be independently configured for connection to a resin reservoir, vacuum source, and/or the like to facilitate resin infusion throughout the mold stack 52. Alternatively, one or both of the inlet/outlet 83 and the inlet/outlet 85 may be reversibly sealed off or omitted in its entirety. The internal conduit 71 and the internal conduit 73 on the third mold piece 58 may be independently configured for connecting to complementary parts (e.g., the internal conduit 61 and the internal conduit 63, respectively) on the adjacent second mold piece 56. The third mold piece 58 may also include one or more interior openings, such as opening 87 and opening 89, which are independently configured to facilitate ingress/egress of resin with respect to the pocket 64.

In some embodiments, the plumbing fixtures used as inlets are the same as the plumbing fixtures used as outlets (e.g., designation of a plumbing fixture as being an inlet or outlet may be a relative determination based simply on the direction of fluid flow). In other embodiments, the plumbing fixtures used as inlets may be structurally different than the plumbing fixtures used as outlets (e.g., a plumbing fixture may be configured such that its function as an inlet or outlet is fixed and/or predetermined).

Figure 2:
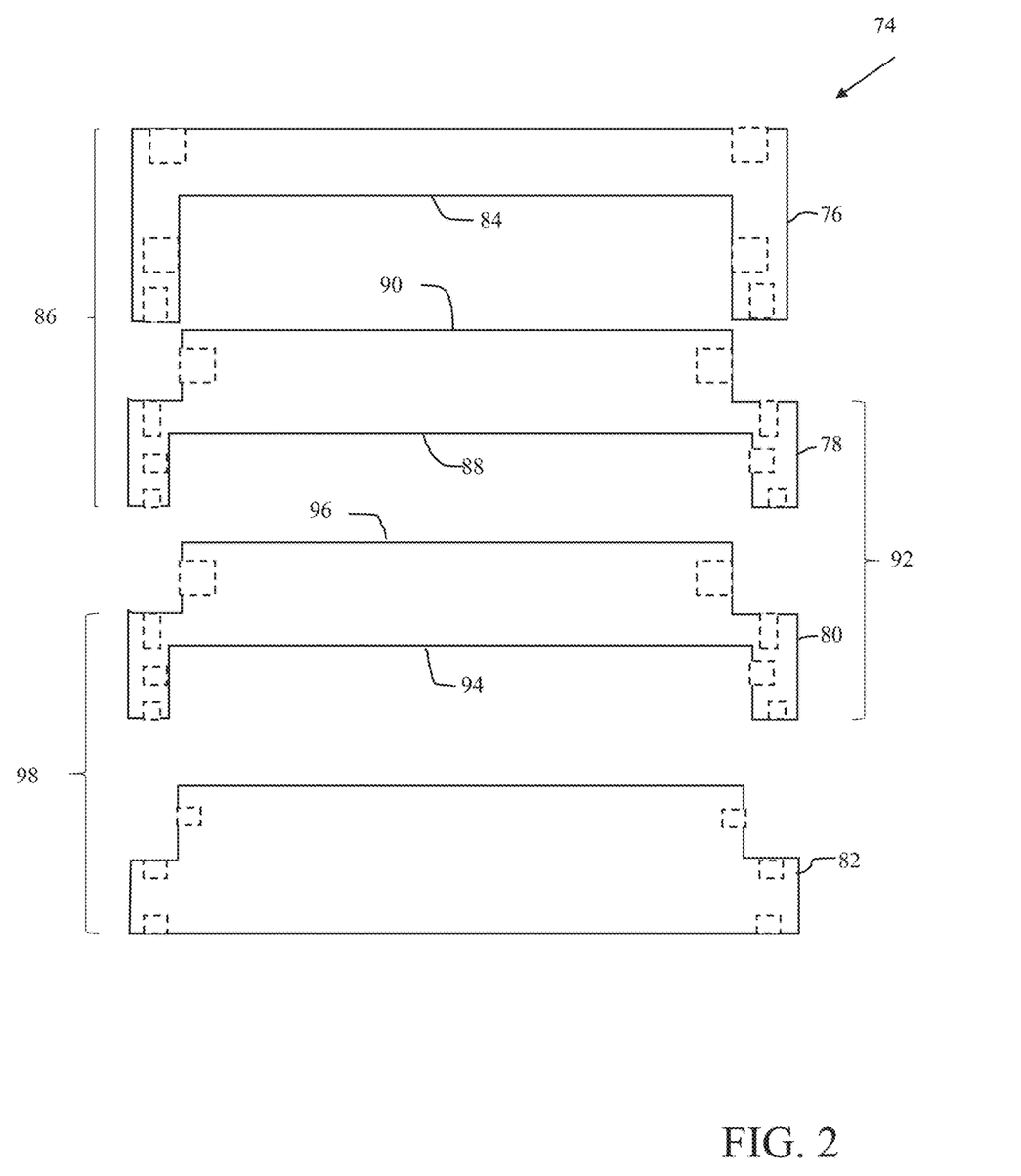
FIG. 2 shows a schematic cross-sectional exploded perspective view of an exemplary second mold stack in accordance with the present teachings.
Figure 3:
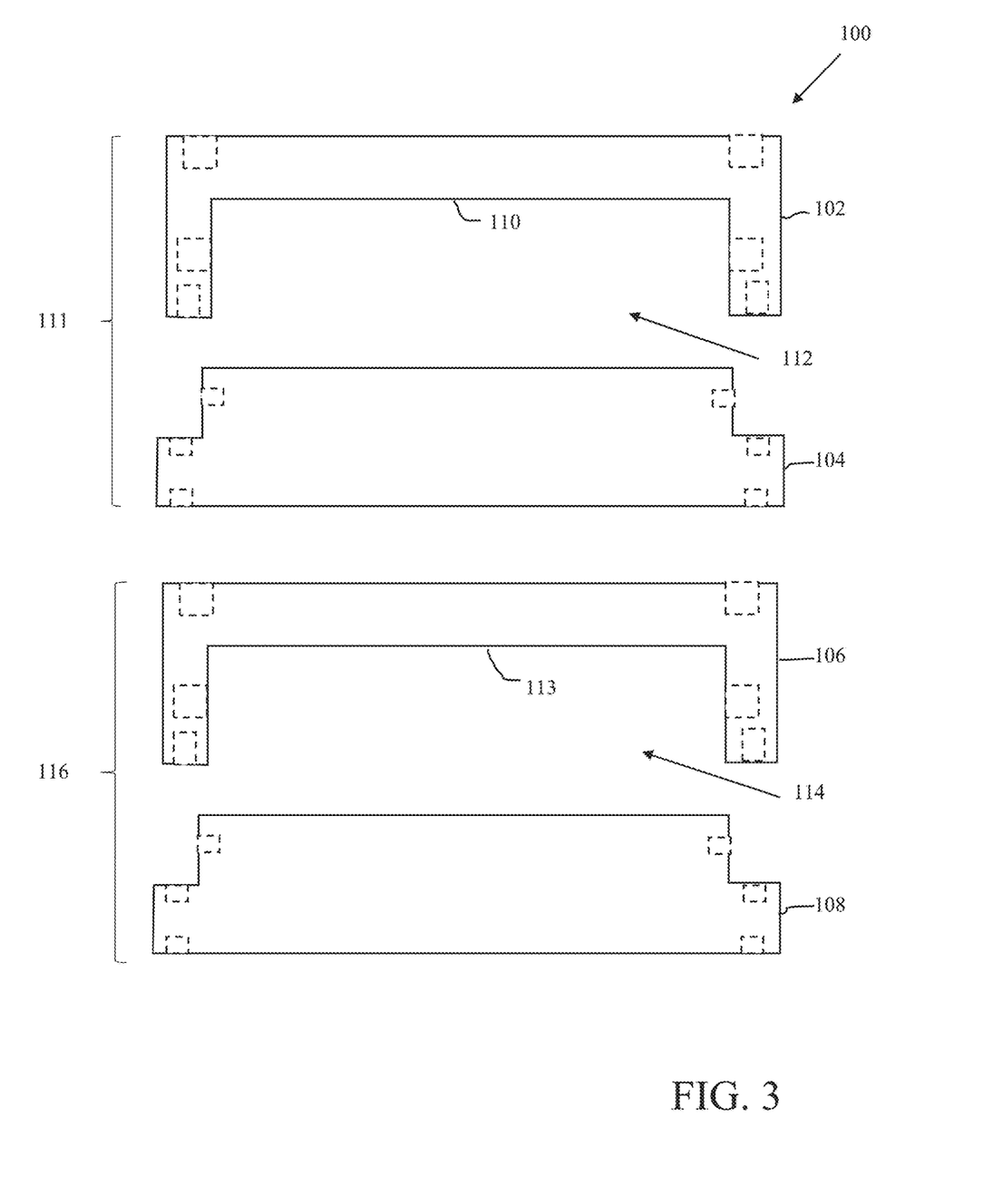
FIG. 3 shows a schematic cross-sectional exploded perspective view of an exemplary third mold stack in accordance with the present teachings.

In some embodiments, the mold stack 52 shown in FIG. 1 (or, indeed, any mold stack formed in accordance with the present teachings, including but not limited to the exemplary mold stacks 74, 100, and 118 shown in FIGS. 2-4, respectively) may be configured such that one of the end mold pieces may provide the only inlet source as well as the only outlet source for the entire mold stack. By way of example, for the exemplary mold stack 52 shown in FIG. 1, the first mold piece 54 may serve as the mold stack's only inlet/outlet source by, for example, closing off—or entirely omitting— both the inlet/outlet 83 and the inlet/outlet 85 from the third mold piece 58.

In other embodiments, the mold stack 52 shown in FIG. 1 (or, indeed, any mold stack formed in accordance with the present teachings, including but not limited to the exemplary mold stacks 74, 100, and 118 shown in FIGS. 2-4, respectively) may be configured such that one of the end mold pieces serves as the only inlet source for the entire mold stack, and another of the end mold pieces serves as the only outlet source for the entire mold stack. By way of example, the inlet/outlet 55 provided on the first mold piece 54 may serve as the mold stack's only inlet source by, for example, closing off—or entirely omitting—the other inlet/outlet 77 from the first mold piece 54. Furthermore, the third mold piece 58 may serve as the mold stack's only outlet source by, for example, closing off—or entirely omitting—either one of the inlet/outlet 83 and the inlet/outlet 85 from the third mold piece 58.

In FIGS. 2-4, the individual mold pieces forming the respective mold stacks are shown with representative inlets/outlets, internal connecting conduits, and interior openings (e.g., for facilitating ingress/egress of resin with respect to a pocket) analogous to those shown and described above in reference to FIG. 1. However, as with the case of FIG. 1, it is to be understood that the provision, placement, and quantity of these various elements is merely representative, and that alternative placements, quantities, and/or even the omission of one or more of these elements may likewise be implemented.

FIG. 2 shows an example of a mold stack 74 that includes a first mold piece 76, a second mold piece 78, a third mold piece 80, and a fourth mold piece 82. In some embodiments, the third mold piece 80 is substantially identical to the second mold piece 78. The four-piece mold stack 74 is configured to produce at least three composite parts (not shown) in accordance with the present teachings. The first mold piece 76 includes a receiving portion 84, and is configured to reversibly couple with the second mold piece 78 to form a first mold layer 86. The second mold piece 78 includes both a receiving portion 88 and a compacting portion 90, and is configured to reversibly couple with the third mold piece 80 to form a second mold layer 92. The third mold piece 80, similarly to the second mold piece 78, includes both a receiving portion 94 and a compacting portion 96, and is configured to reversibly couple with the fourth mold piece 82 to form a third mold layer 98. It will be appreciated that additional mold layers in addition to the first mold layer 86, the second mold layer 92, and the third mold layer 98 may be formed by adding one or more additional intermediate mold pieces (e.g., analogous to second mold piece 78 and third mold piece 80) to the mold stack 74.

FIG. 3 shows an example of a mold stack 74 that includes a first mold piece 102, a second mold piece 104, a third mold piece 106, and a fourth mold piece 108. The four-piece mold stack 74 is configured to produce at least two composite parts (not shown) in accordance with the present teachings. The first mold piece 102 includes a receiving portion 110, and is configured to reversibly couple with the second mold piece 104 to form a first mold layer 111. The third mold piece 106 includes a receiving portion 113, and is configured to reversibly couple with the fourth mold piece 108 to form a second mold layer 116. As shown in FIG. 3, the second mold piece 104 is configured to couple with the third mold piece 106, such that fluid communication may be established between a pocket 112 in the first mold layer 111 and a pocket 114 in the second mold layer 116. It will be appreciated that additional mold layers in addition to the first mold layer 111 and the second mold layer 116 may be formed by adding one or more additional sets of complementary intermediate mold pieces (e.g., each set being analogous to the pairing of second mold piece 104 and third mold piece 106) to the mold stack 100.

FIG. 4 shows an example of a mold stack 118 that includes a first mold piece 120, a second mold piece 122, and a third mold piece 124. In some embodiments, the first mold piece 120, the second mold piece 122, and the third mold piece 124 are substantially identical. The three-piece mold stack 118 is configured to produce at least two composite parts (not shown) in accordance with the present teachings. The second mold piece 122 includes a receiving portion 126, and is configured to reversibly couple with the first mold piece 120 to form a first mold layer 128. The second mold piece 122 includes both a receiving portion 126 and a compacting portion 130, and is configured to reversibly couple with the third mold piece 124 to form a second mold layer 132. It will be appreciated that additional mold layers may be added to the mold stack 118 by, for example, including additional mold pieces analogous to the first mold piece 120, the second mold piece 122, and the third mold piece 124. For embodiments in which the first mold piece 120, the second mold piece 122, and the third mold piece 124 are substantially identical, as in FIG. 4, the end pieces (e.g., first mold piece 120 and/or third mold piece 124) may be configured such that one or more resin inlets and/or one or more vacuum outlets and/or one or more interior openings, and/or the like are blocked off that might otherwise be left open if the mold piece in question were to be used as an intermediate piece rather than as an end piece.

In some embodiments, a mold stack to be used in accordance with the present teachings may include one or a plurality of resin inlets and one or a plurality of vacuum outlets. One or more of the individual mold pieces (e.g., the first mold piece, the second mold piece, the third mold piece, the fourth mold piece, etc.) that together form a mold layer and/or the mold stack may include an alignment feature (e.g., a tongue-and-groove mechanism) configured to align layers (e.g., adjacent mold layers) so that the layers are substantially parallel in the mold stack.

The following examples and representative procedures illustrate features in accordance with the present teachings, and are provided solely by way of illustration. They are not intended to limit the scope of the appended claims or their equivalents.

A representative process and representative materials for use in accordance with the present teachings will now be described in reference to additional drawings. As shown in FIG. 5A, a first mold piece 2 includes a pocket 4 in the shape of a composite part that is to be produced. The pocket 4 is configured to accept dry fiber. The first mold piece 2 shown in FIG. 5A may be fabricated, for example, from high-density polyethylene (HDPE) on a computer-controlled router. The HDPE machines well and provides a surface finish that is suitable for molded surfaces. The pocket 4 in the first mold piece 2 is deeper than the actual thickness of the composite part to be made in order facilitate winding and compaction. As shown in FIG. 5A, the first mold piece 2 is polylithic and includes a combination of separable parts. For example, each of the corner posts 5 in the mold piece 2 is removable.

Figures 5C, 5D:
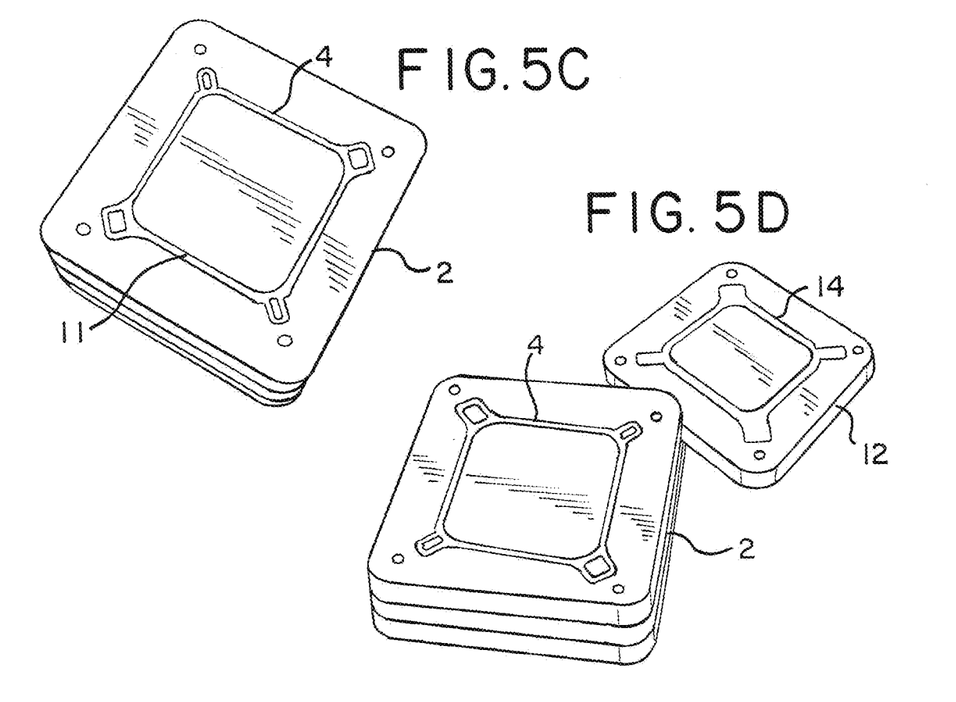
FIG. 5C shows a top plan view of an exemplary mold piece containing dry carbon filament wound in a pocket thereof.
FIG. 5D shows a perspective view in an unassembled state of the exemplary mold piece of FIG. 5C together with a complementary male mold piece configured to contact and compact the wound dry carbon filament.

As shown in FIG. 5B, a three-axis computer-controlled machine may be used to trace the path of the pocket 4 using an attachment 6 configured to lay dry fiber in a prescribed path. The attachment 6 is configured to hold a spool 7 of 12 k carbon fiber tow and, in some embodiments, uses smoothed silicon carbide loops to guide the carbon fiber down to the tip 8 of a thin precision rod 10 where it enters the first mold piece 2. In some embodiments, the programmed path of the machine may be designed to loop around features that could benefit from additional reinforcement. When an amount of carbon fiber has been laid to produce sufficient eventual fill fraction, the loose fiber 11 is ready to be compacted to the final part dimensions, as shown in FIG. 5C. Compaction may be achieved by using a second mold piece 12 that together with the first mold piece 2 is configured to from a compression-type mold. As shown in FIG. 5D, the second mold piece 12 includes a male feature 14 in the same shape as the pocket 4. In some embodiments, the height of the male feature 14 is less than a depth of the pocket 4 by the exact thickness of the desired composite part. The second mold piece 12 closes the first mold layer, and may include alignment features (e.g., on a side opposite the side that supports the male feature 14) configured to support an additional (e.g., adjacent) mold layer.

Figures 5E, 5F:
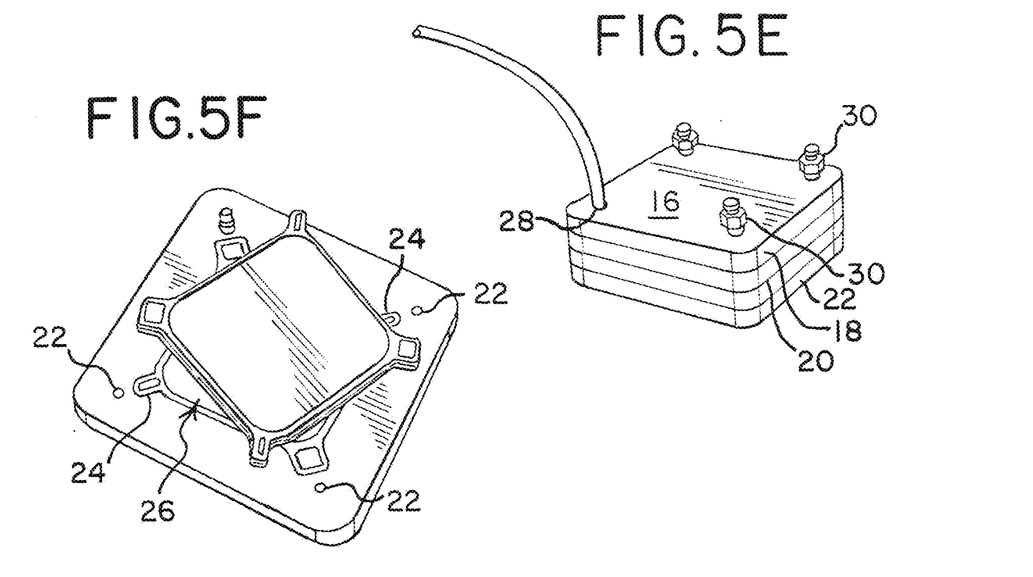
FIG. 5E shows a perspective view of an exemplary mold stack in an assembled state that contains three mold layers, one resin inlet, and three vacuum outlets.
FIG. 5F shows a perspective view of exemplary mold layers supporting exemplary cured composite parts after de-molding.

As shown in FIG. 5E, a plurality of mold layers may be stacked together to form a mold stack 16. The representative mold stack shown in FIG. 5E includes a first mold layer 18, a second mold layer 20, and a third mold layer 22. However, in other embodiments in accordance with the present teachings, the mold stack 16 may include fewer or additional mold layers than the three shown in FIG. 5E.

Figures 7A, 7B:
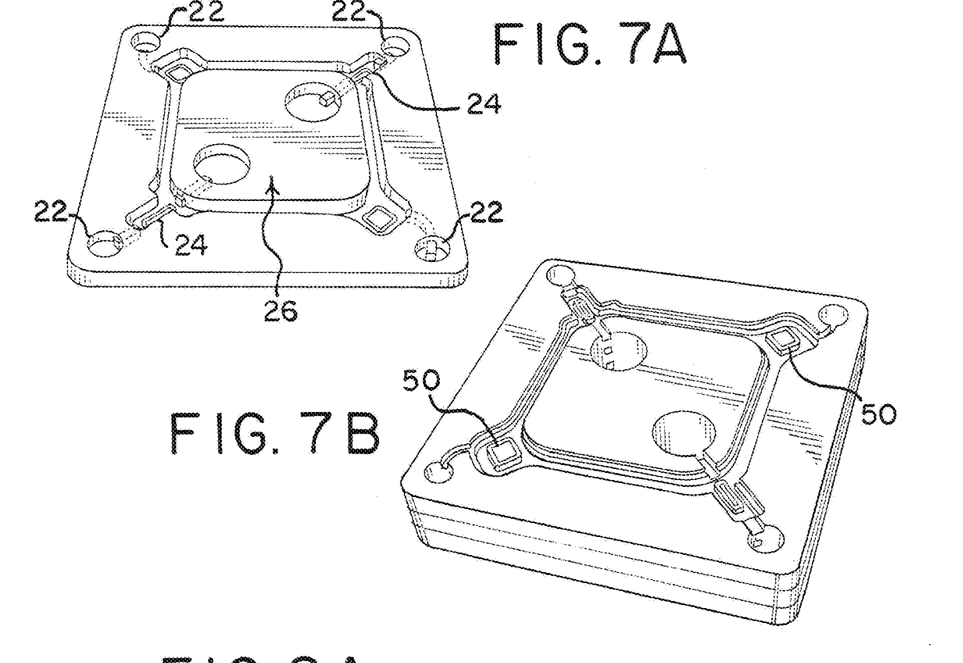
FIG. 7A shows a schematic perspective view of an exemplary mold layer in which representative resin paths are indicated.
FIG. 7B shows a schematic perspective view of an exemplary mold layer including representative manifolds and ports for resin transfer.

In some embodiments, each of the first mold layer 18, the second mold layer 20, and the third mold layer 22 is sequentially wound with dry carbon fiber to build up the full mold stack 16. In addition to supporting features configured to facilitate winding and compacting of the fiber, each layer of the mold stack 16, as shown in FIG. 5F, also contains a plurality (e.g., four) of through-holes 22 and small pockets 24 that connect the mold cavity 26 to the through-holes 22. Representative resin paths between the through-holes 22 and the mold cavity 26 are also shown in FIG. 7A. With multiple mold layers, these features form manifolds for use in an RTM-type process. As shown in FIG. 5E, the top mold layer 19 may include plumbing fixtures, such as the resin inlet 28 and the vacuum outlets 30, whereas the bottom layer 22 is blocked off. In some embodiments, vacuum (e.g., between about 7 and about 10 psi) may be applied at one or a plurality of manifolds (e.g., vacuum outlets 30) in order to draw resin into the mold through an additional manifold (e.g., inlet 28). In some embodiments, the resin used for this purpose is a commercially available, high-strength, room-temperature-curing epoxy sold under the trade name 105 EPOXY RESIN (West System Inc.).

The mold stack 16 shown in FIG. 5E may be infused with resin in parallel. Parallel infusion greatly simplifies the RTM process since a single batch of resin may be mixed and flowed into the entire mold. As resin flows faster through vacant channels than channels filled with dry fiber, a large number of parallel molds may be ganged together without substantially affecting the time required for resin infusion. In addition, fine control over the infusion may be achieved by adding as many vacuum manifolds as desired and by using external valves to control their relative pulls. For example, in the representative embodiments shown in FIG. 5E, three vacuum manifolds 30 are provided to facilitate even infusion to the edges of the mold stack 16. Each of the three vacuum manifolds 30 may be connected to a valve (not shown), so that when resin appears in any one, the vacuum to the corresponding manifold may be shut off in order to avoid unnecessary pull.

Figure 6:
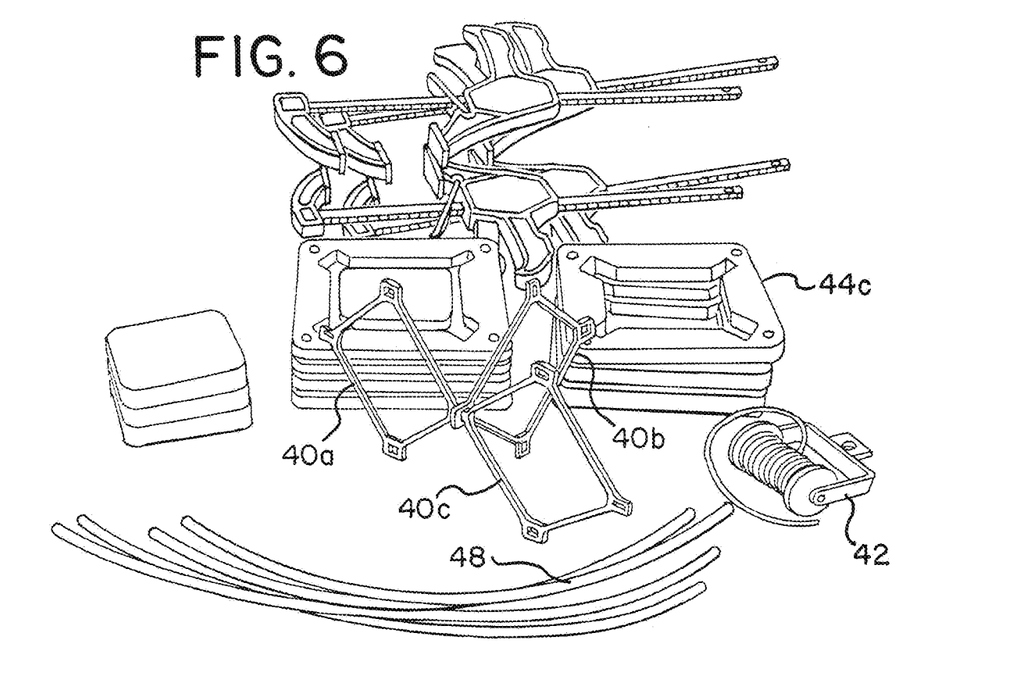
FIG. 6 shows a perspective view of exemplary clamps, three types of exemplary mold pieces, three identical exemplary composite parts (in an assembled state) that are obtained from an exemplary mold, an exemplary automated winding attachment with 100 feet of 12 k carbon fiber tow to the spool, and exemplary tubing configured for resin transfer.

FIG. 6 shows representative parts that may be used in accordance with and/or produced in accordance with the present teachings. By way of example, FIG. 6 shows three de-molded composite parts 40a, 40b, and 40c. In addition, FIG. 6 shows a fiber-winding attachment 42 and three types of mold pieces 44a, 44b, and 44c. FIG. 6 also shows clamps 46 and plumbing (e.g., resin transfer tubing) 48.

Figure 8A:
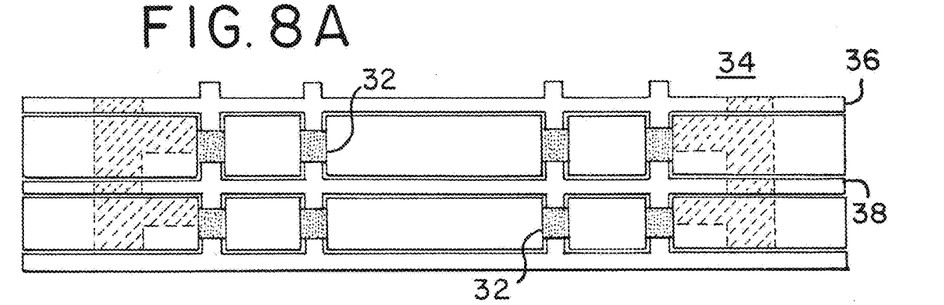
FIG. 8A shows a cross-section of an exemplary mold stack.

In accordance with the present teachings, each mold piece may contact the composite part along a surface that parts along a single vector. In other words, internal corners on a single mold piece, which might otherwise cause problems during de-molding, may be avoided. FIG. 8A shows a cross-sectional view of a composite part 32 in a mold 34. The mold 34 includes a first mold piece 36 and a second mold piece 38. The solid regions indicate the internal hollows that form the RTM manifolds. Thus, as shown in FIG. 8A, complex geometries may be formed that may still be easily de-molded. In some embodiments, small recesses may be milled into each mold layer to aid in parting. Thus, in accordance with the present teachings, de-molding is a non-destructive and predictable process.

Figure 8B:
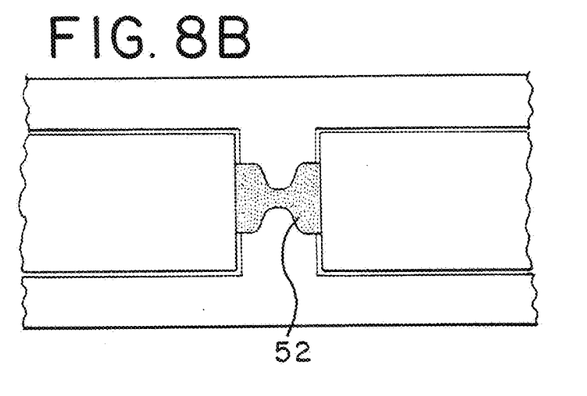
FIG. 8B shows a cross-section of an exemplary mold stack supporting an I-beam-shaped composite part.

Many variations may be made to the representative structures described herein and shown, for example, in FIG. 6. For example, for precision composite parts that interface with other objects or one another, mold interface pieces may be used in the process. FIG. 7B shows an example of how the inserts 50 may be placed in the mold pocket at each layer to be wound around with carbon fiber. In addition, although the shape of the exemplary composite part depicted in FIG. 6 is a square with a substantially uniform cross section, this geometry is not limiting and all manner of other configurations, including but not limited to parts having arbitrary cross sections, may likewise be made in accordance with the present teachings. For example, FIG. 8B shows a cross-section of a representative composite part 52 resembling an I-beam. In addition, it should be noted that each layer of a mold stack may not contain the pocket for a single part. In some embodiments, each mold layer may include an array of mold pockets, and the winding machine may dispense many fiber bundles with the same three-axis motion system, thereby further parallelizing composite part production.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A process for producing a composite part comprising:
applying a single dry carbon filament to a receiving portion of a first mold piece, the single dry carbon filament being shaped into a predetermined shape having a directional alignment producing a shaped dry carbon filament;
reversibly coupling the first mold piece with at least a second mold piece to form a first mold layer, wherein an interior region of the first mold layer comprises a pocket containing the shaped dry carbon filament and configured to receive a curable resin, the pocket having a shape of the composite part;
infusing the curable resin into the pocket; and curing the resin to form the composite part.

2. The process of claim 1 wherein the single dry carbon filament is applied to the receiving portion using a three-axis computer-controlled machine.

3. The process of claim 1 wherein each of the first mold piece and the second mold piece is independently monolithic or polylithic.

4. The process of claim 1 wherein the second mold piece comprises a compacting portion, wherein the compacting portion and the receiving portion are together configured to compact the shaped dry carbon filament therebetween.

5. The process of claim 4 wherein a length of the compacting portion is less than a depth of the receiving portion by an amount that it is substantially equal to a thickness of the composite part.

6. The process of claim 1 further comprising reversibly coupling one or a plurality of additional mold pieces with the first mold piece and/or the second mold piece to form one or more additional mold layers that are configured for stacking in parallel with the first mold layer, and wherein each of the one or more additional mold layers comprises a respective pocket containing a copy of the shaped dry carbon filament and configured to receive the curable resin, and wherein each respective pocket has the shape of the composite part.

7. The process of claim 6 wherein the first mold layer and the one or the more additional mold layers are in fluid communication, and wherein the first mold layer and the one or more additional mold layers stacked therewith are configured to receive a parallel infusion of the curable resin.

8. The process of claim 6 wherein one or more of the first mold layer and the one or more additional mold layers comprises one or a plurality of resin inlets and/or one or a plurality of vacuum outlets.

9. The process of claim 1 wherein the first mold layer comprises one or a plurality of resin inlets and/or one or a plurality of vacuum outlets.

10. The process of claim 1 wherein the single dry carbon filament comprises spoolable dry carbon fiber tow.

11. The process of claim 10 wherein the spoolable dry carbon fiber tow is selected from the group consisting of 1K tow, 3K tow, 6K tow, 12K tow, 24K tow, 50K tow, and combinations thereof.

12. The process of claim 1 wherein each of the first mold piece and the second mold piece comprises high-density polyethylene (HDPE).

13. The process of claim 1 wherein the curable resin comprises epoxy.

14. A process for producing a composite part comprising:
applying a first single dry carbon filament to a first receiving portion of a first mold piece via a three-axis computer-controlled machine, the first single dry carbon filament shaped to have a first desired shape with first directional alignment;
reversibly coupling the first mold piece with a second mold piece to form a first mold layer, wherein an interior region of the first mold layer comprises a pocket configured to receive a curable resin, the pocket having a shape of the composite part;
applying a second single dry carbon filament via the three-axis computer controlled machine to a second receiving portion, wherein the second receiving portion is provided on the second mold piece and/or on a third mold piece, the second single dry carbon filament having a second desired shape with a second directional alignment;
forming a second mold layer by (a) reversibly coupling the third mold piece with the first mold piece and/or the second mold piece or (b) reversibly coupling the third mold piece with the first mold piece and/or the second mold piece and, further, reversibly coupling the third mold piece with a fourth mold piece, the first and second mold layers forming a mold stack;
infusing the curable resin into the mold stack; and
curing the resin to form the composite part;
wherein the first mold layer and the second mold layer are configured to be ganged together to form the mold stack, and wherein the first mold layer and the second mold layer are in fluid communication.

15. The process of claim 14 wherein the mold stack comprises one or a plurality of resin inlets and one or a plurality of vacuum outlets.

16. The process of claim 14 wherein one or more of the first mold piece, the second mold piece, the third mold piece, and the fourth mold piece comprises an alignment feature configured to align the first mold layer and the second mold layer so as to be substantially parallel in the mold stack.

17. The process of claim 14 wherein the second receiving portion is provided on the second mold piece, and wherein the second mold layer is formed by reversibly coupling the third mold piece to at least the second mold piece, the process further comprising:
reversibly coupling the third mold piece to a fourth mold piece to form a third mold layer;
wherein the first mold layer, the second mold layer, and the third mold layer are configured to be ganged together to form the mold stack, and wherein the first mold layer, the second mold layer, and the third mold layer are in fluid communication.

18. The process of claim 14 wherein the third mold piece is reversibly coupled with, and in fluid communication with, the second mold piece, and wherein the second mold layer is formed by reversibly coupling the third mold piece with a fourth mold piece.

19. The process of claim 14 wherein the second desired shape with the second directional alignment is the same as the first desired shape with the first directional alignment.

* * * * *